(12) United States Patent
Shin

(10) Patent No.: US 12,443,317 B2
(45) Date of Patent: Oct. 14, 2025

(54) ASSISTANT CONTROL VIA DETECTING TACTILE MODULATION OF ULTRASONIC SIGNAL

(71) Applicant: GOOGLE LLC, Mountain View, CA (US)

(72) Inventor: Dongeek Shin, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 8 days.

(21) Appl. No.: 18/076,727

(22) Filed: Dec. 7, 2022

(65) Prior Publication Data

US 2024/0192808 A1 Jun. 13, 2024

(51) Int. Cl.
| | | |
|---|---|---|
| *G06F 3/043* | (2006.01) | |
| *G06F 1/16* | (2006.01) | |
| *G10L 15/22* | (2006.01) | |
| *G10L 21/0208* | (2013.01) | |

(52) U.S. Cl.
CPC .............. *G06F 3/043* (2013.01); *G06F 1/163* (2013.01); *G10L 15/22* (2013.01); *G10L 21/0208* (2013.01); *G10L 2021/02087* (2013.01)

(58) Field of Classification Search
CPC ........ G06F 1/163; G06F 3/017; G06F 3/0416; G06F 3/04182; G06F 3/043–0436; G06F 3/167; G06F 2200/1636; G06F 2203/0381; G06F 2203/0383; G10L 15/22; G10L 15/28; G10L 2015/223; G10L 17/22; G10L 21/0208; G10L 21/0216; G10L 2021/02087; G10L 2021/02165–02166; H04R 2499/11; G01S 1/72–807

See application file for complete search history.

(56) References Cited

U.S. PATENT DOCUMENTS

| | | | | |
|---|---|---|---|---|
| 10,157,628 | B1* | 12/2018 | Liu ......................... | G06F 3/167 |
| 2016/0125876 | A1* | 5/2016 | Schroeter ................ | G10L 15/20 |
| | | | | 704/226 |
| 2016/0295161 | A1* | 10/2016 | Pratt ....................... | H04N 7/147 |

(Continued)

OTHER PUBLICATIONS

Roy, Nirupam; "Inaudible Acoustics: Techniques and Applications"; Graduate College of University of Illinois; 156 pages; dated 2018.

(Continued)

*Primary Examiner* — Keith L Crawley
(74) *Attorney, Agent, or Firm* — Gray Ice Higdon

(57) ABSTRACT

Implementations set forth herein relate to facilitating control of an automated assistant or other application by rendering an ultrasonic signal that can be modulation through tactile interaction with physical portions of a computing device. The computing device can provide an acoustic signal via a speaker of the computing device, and the acoustic signal can be received by one or more microphones of the computing device. During transmission, a portion of the acoustic signal can travel through a housing of the computing device, which the user can tap or otherwise use to provide a gesture. Audio data generated using the microphone can reflect changes to the acoustic signal, and those changes can be indicative of a particular gesture received at the housing. When a particular gesture is detected, the automated assistant or other application can respond to the gesture by initiating one or more particular operations.

20 Claims, 7 Drawing Sheets

(56) References Cited

U.S. PATENT DOCUMENTS

| | | | | |
|---|---|---|---|---|
| 2017/0220171 | A1* | 8/2017 | Shin | G06F 3/041 |
| 2019/0371311 | A1* | 12/2019 | Patel | G06F 3/167 |
| 2020/0233499 | A1* | 7/2020 | Tkaczuk | G06F 1/1684 |
| 2021/0231615 | A1* | 7/2021 | Munemoto | G01N 29/036 |
| 2021/0240435 | A1* | 8/2021 | Nedelcu | H04R 1/406 |
| 2021/0409879 | A1 | 12/2021 | Riemer et al. | |
| 2022/0353611 | A1* | 11/2022 | Bouvigne | H04R 3/005 |
| 2023/0350059 | A1* | 11/2023 | Madrigal | G01S 7/523 |
| 2024/0127842 | A1* | 4/2024 | Tsiaflakis | G10L 25/60 |

OTHER PUBLICATIONS

Yang, et al.; "EchoLock: Towards Low-effort Mobile User Identification Leveraging Structure-borne Echos"; ASIA CCS'20; Sesson 14: CPS Security; 12 pages; dated Oct. 2020.

European Patent Office; International Search Report and Written Report issued in Application No. PCT/US2022/052255; 20 pages; dated Aug. 3, 2023.

\* cited by examiner

ASSISTANT CONTROL VIA DETECTING TACTILE MODULATION OF ULTRASONIC SIGNAL

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

Many devices facilitate assistant invocation via touch screens that a user can tap to invoke the automated assistant, and/or audio interfaces that can receive invocation phrases spoken by a user. However, certain invocation techniques may exhibit delays caused by processes, such as automatic speech recognition and/or natural language understanding. In some instances, a device may not have the hardware to facilitate touch screen interactions and/or natural language understanding, therefore enabling quick assistant invocations on such devices may be futile. For example, enabling touch invocation of the automated assistant on a watch that does not include a touch screen can clicking (e.g., using tactile buttons on the watch) through a list of applications on the watch until an automated assistant application is selectable from the list. This can consume computational resources of the watch, which may already have limited resources because of the compact size of the watch restricting any space for memory and/or an advanced system on a chip (SoC).

SUMMARY

Implementations set forth herein relate to an automated assistant that can be invoked or otherwise controlled by enabling touch gestures for manipulating wave propagation between one or more speakers and one or more microphones of a computing device. The wave to be manipulated can include a wave that is outside of a range of human hearing, such as an ultrasonic or non-ultrasonic wave emitted by a speaker of a computing device, and can propagate through the air and/or through physical features (e.g., a housing) of the computing device. For example, the computing device can include a smart watch that includes one or more speakers and one or more microphones that are attached to a housing of the smart watch. The computing device can operate to cause a speaker to emit an ultrasonic wave that is received as an input to a microphone. When a user directly touches a location on the housing between the microphone and the speaker, propagation of the ultrasonic wave can be interrupted, and this interruption can be embodied in audio data detected using the microphone. The detected audio data can be processed to detect the interruption that is caused by the user touching the location on the computing device, and action(s) performed in response to detecting the interruption. In some implementations, the action(s) performed in response to detecting the interruption include invoking the automated assistant for receiving a spoken utterance from the user and/or for otherwise initializing performance of one or more other automated assistant actions. Alternatively, or additionally, the computing device can communicate, via wireless communication protocol such as Bluetooth, with a separate computing device (e.g., a cellular phone) to control a particular application in response to the touch gesture.

In some implementations, processing audio data captured via the microphone can be performed such that the computing device can be responsive to a user swiping toward or away from a speaker, and/or toward or away from a microphone. For example, the audio data can be processed to determine whether the audio data indicates no touching of the computing device, a tap on the computing device, a swipe in a first direction on the computing device, or a swipe in a second direction on the computing device. Different actions can be performed in response to different detected touch interactions. For example, no action can be performed when no touching of the computing device is determined, a first action can be performed when a tap is determined, a second action can be performed when a swipe in a first direction is determined, and a third action can be performed when a swipe in a second direction is determined. As one particular example, while the speaker is emitting an ultrasonic wave, the user can tap or otherwise provide direct contact with a location between the speaker and the microphone to invoke the automated assistant (e.g., the automated assistant can be invoked in response to detecting the tap in audio data). When the automated assistant is invoked for detecting a subsequent spoken utterance from the user, the user can provide a spoken utterance such as, "Play some music," without expressly providing an invocation phrase (e.g., "Assistant . . . "). In response, the automated assistant can cause certain audible media to be rendered via the speaker of the computing device, while the speaker is also emitting the ultrasonic wave. The user can then touch a location on the housing of the computing device, between the speaker and the microphone, and swipe in a direction of the speaker (e.g., to the left) or a direction of the microphone (e.g., to the right). In response, and based on processing audio data captured by the microphone to determine the swipe gesture, a volume of the audible media can be adjusted according to the determined swipe gesture.

In some implementations, such swipe gestures can be facilitated on certain computing devices that include multiple microphones by enabling audio processing techniques that can identify swipe gestures that involve swiping away from a first microphone and towards a second microphone. For example, an ultrasonic wave, embodying one or more frequencies, can be emitted by a speaker of the computing device, and the ultrasonic wave can be captured by the microphones of the computing device. A first microphone can capture first audio data and a second microphone can capture second audio data, and each instance of audio data can characterize the ultrasonic wave form. When the swipe gesture results in a user temporarily covering the first microphone and then subsequently covering the second microphone, the first audio data will exhibit a decrease in amplitude earlier in time than another decrease in amplitude exhibited in the second audio data.

In some implementations, when such signal characteristics are identified in the first audio data and the second audio data within a threshold duration of time, the automated assistant or other application can cause one or more particular operations to be performed. For example, such swipe gestures can result in song being "skipped" during music playback, or playback of a song starting over (e.g., returning to a time-stamp of 0:00). Alternatively, or additionally, a swipe gesture detected between microphones can cause images and/or application icons to be scrolled through, in order that a user can select a particular image and/or icon. In this way, devices that do not include touch displays can nonetheless facilitate touch gestures that are more efficient than repeatedly pressing certain physical buttons.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
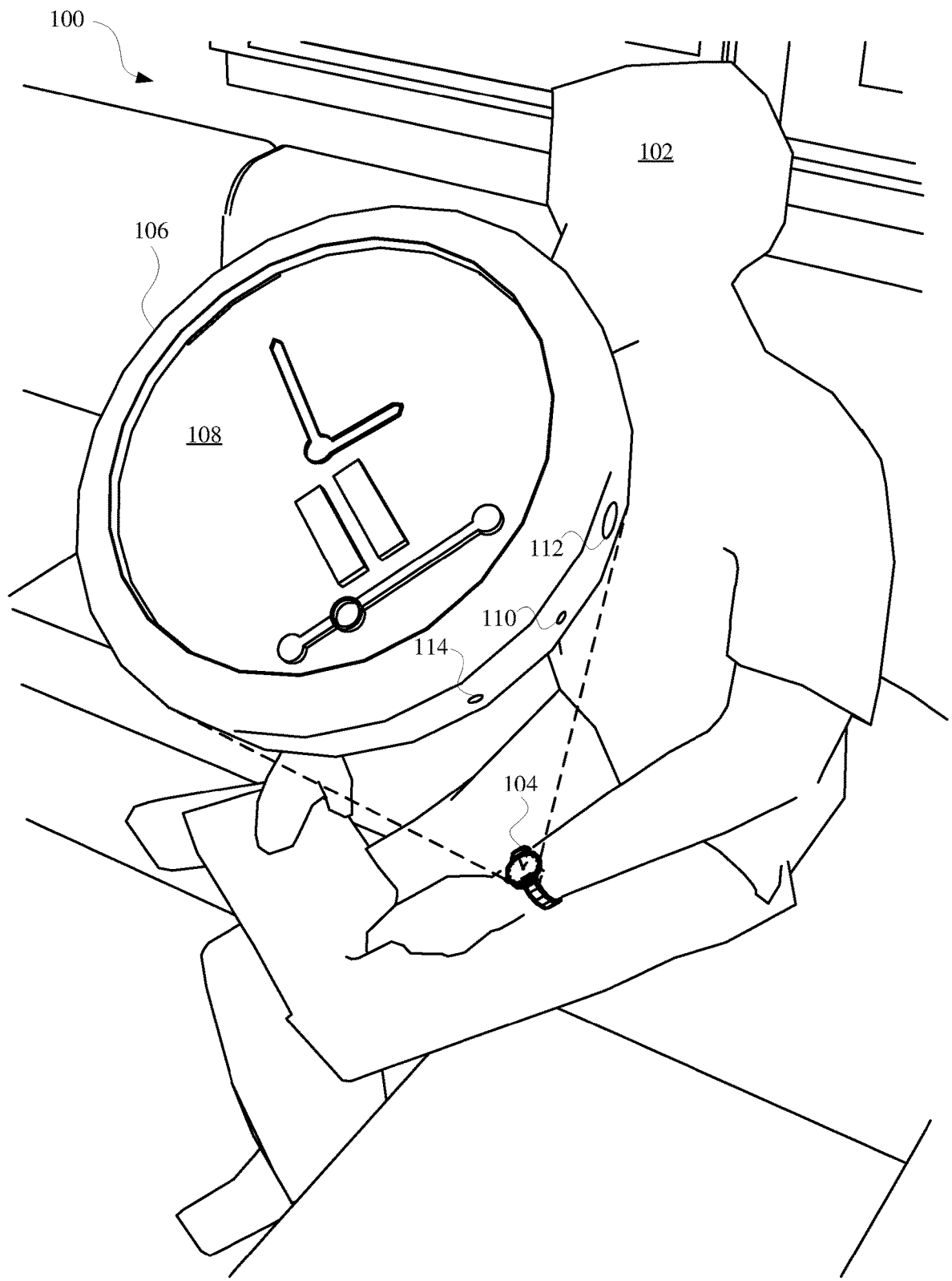
FIG. 1A, FIG. 1B, and FIG. 1C illustrate views of a user providing touch gestures to one or more microphones of a computing device to interact with an automated assistant.
Figure 1B:
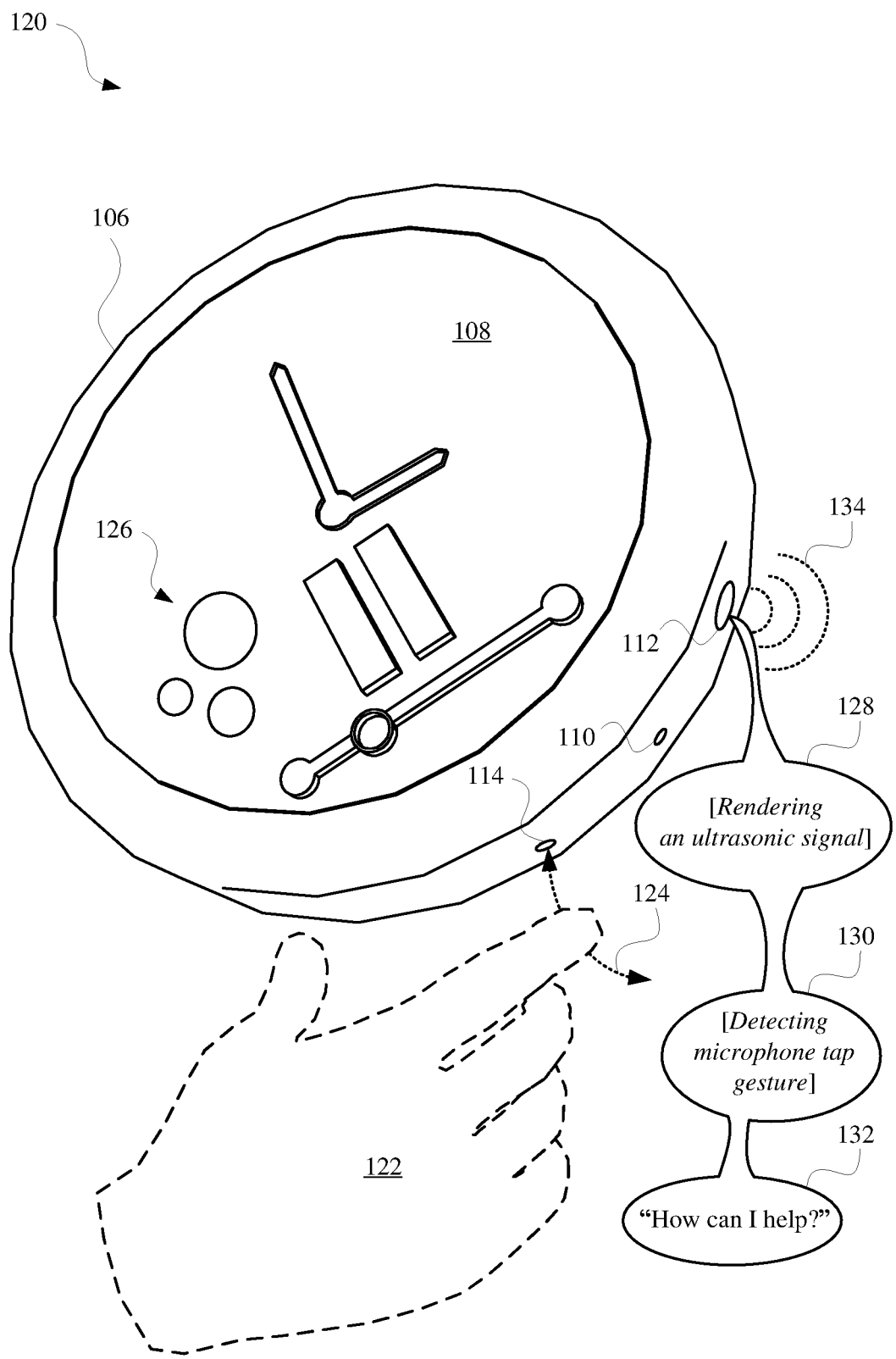
Figure 1C:
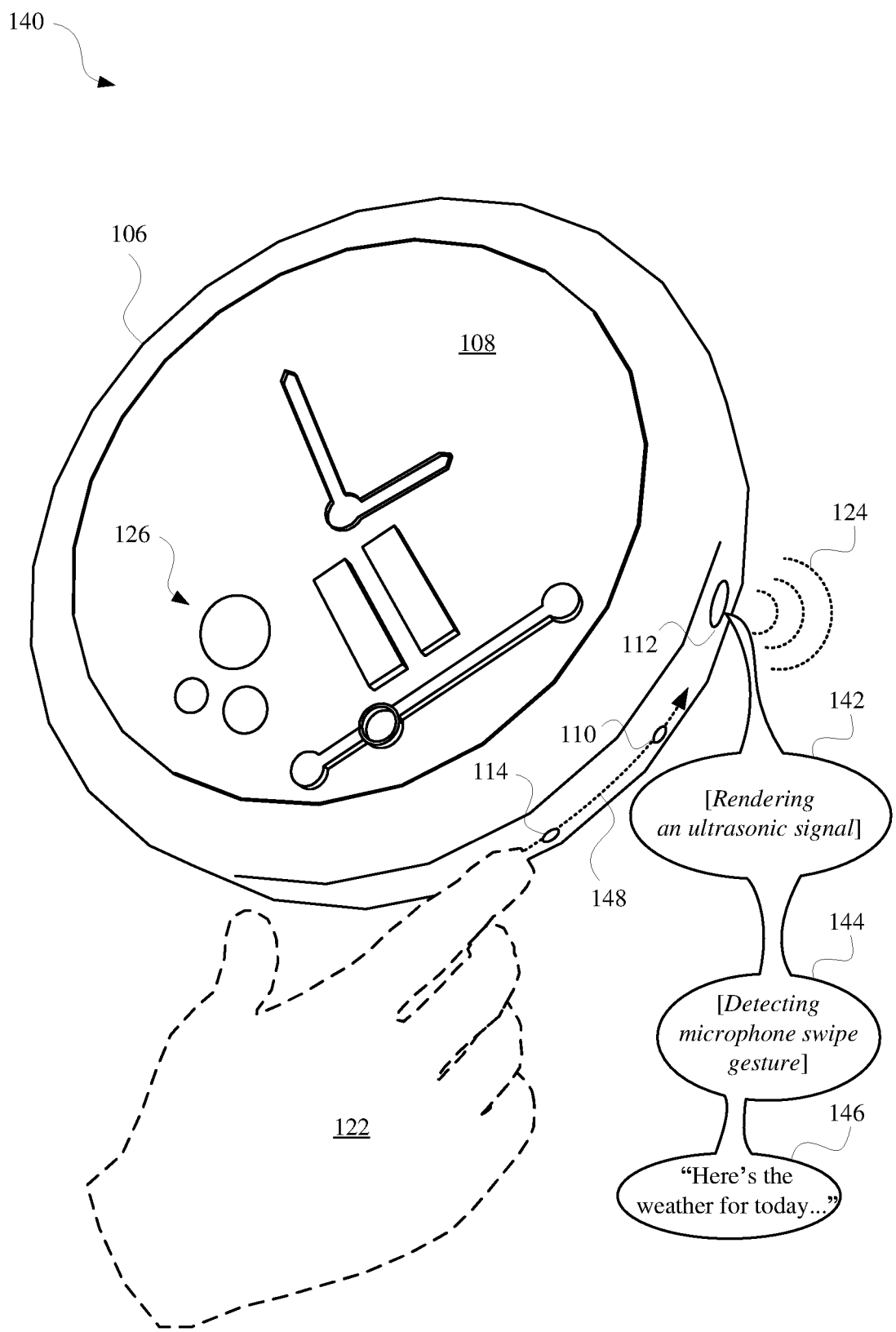

FIG. 1A, FIG. 1B, and FIG. 1C illustrate a view 100, a view 120, and a view 140 of a user 102 providing touch gestures to one or more microphones of a computing device 104 to interact with an automated assistant. A touch gesture can be provided to a first microphone 108 and/or a second microphone 110 while a speaker 112 of the computing device 104 is rendering an output that can be detected by the microphones. The type of gesture can be determined by the computing device 104 and/or an application of the computing device 104 according to how features of the rendered output are modified by the touch gesture to the microphones. In some implementations, the computing device 104 can be a wearable device, such as a smart watch worn on a wrist of the user 102, that can include a display interface 108, a housing 106, and other components that facilitate operations of the computing device 104. The housing 106 can include apertures for portions of an audio system of the computing device 104, and the apertures can be temporarily covered by the user 102 to indicate certain inputs from the user.

As an example, and as illustrated in FIG. 1B, the user 102 can user their hand 122, finger, or other extremity, to provide a tap gesture 124 to an aperture of a first microphone 114 of the computing device 104 while the speaker 112 is rendering an ultrasonic signal 128 as an output 134. Alternatively, the tap gesture 124 can optionally be provided when the computing device 104 is rendering an output 134, such as an audible news clip or other media simultaneous to rendering the ultrasonic signal 128. The computing device 104 can process inputs to the first microphone 114 and an optional second microphone 110 to determine whether any modifications to the ultrasonic signal have occurred. In some implementations, processing the inputs can include using one or more heuristic processes and/or one or more trained machine learning models to categorize features exhibited by signals captured by the microphones (e.g., whether a change to a signal occurred a threshold number of times). For example, a sharp decline and/or temporary decline in amplitude of the detected ultrasonic signal can result in an indication 130 that a tap gesture 124 has been performed. In response, and according to the settings of the computing device 104 and/or applications of the computing device 104, one or more operations may be initialized at the computing device 104. For example, in response to detecting the tap gesture 124 at the first microphone 114, an automated assistant application of the computing device 104 can initialize a preconfigured routine, such as providing an audible output 132 (e.g., a first operation) such as, "How can I help?" and/or render a display notification 126 (e.g., a second operation) indicating that the automated assistant has been initialized and/or indicating the status of any other applications. This can allow the user 102 to bypass providing an invocation phrase (e.g., "Ok Assistant . . . ") to invoke the automated assistant and instead, simply tap the housing 106 of the computing device 104 and thereafter provide another spoken utterance (e.g., "Start a timer.").

In some implementations, a swipe gesture or other gesture can be performed to initialize other operations without requiring a touch display interface. For example, and as illustrated in view 140 of FIG. 1C, the user 102 can perform a swipe gesture 148 to interrupt detection of the output 134 by the first microphone 114 and/or the second microphone 110. The swipe gesture 148 can be performed when the speaker 112 is rendering music and an ultrasonic signal 142 (e.g., a signal embodying a frequency that is inaudible to humans and/or above 20 kHz). The swipe gesture 148 can be performed in the direction illustrated in FIG. 1C and/or can be performed in the opposite direction (e.g., from the second microphone 110 and/or speaker 112, to the first microphone 114). The computing device 104 and/or other application can detect 144 the microphone swipe gesture based on a change in amplitude of the detected ultrasonic signal at the first microphone 114 followed by a subsequent change in amplitude of the detected ultrasonic signal at the second microphone 110. Based on this detection of the swipe gesture, an automated assistant of the computing device 104 can perform a routine that can include operations such as providing a weather report for the day. In some implementations, the routine that is performed can be based on a detected direction of the swipe gesture. For example, a right swipe can cause the aforementioned weather routine to be performed, and a left swipe can cause "goodnight" routine to be performed (e.g., silence a cell phone, set an alarm, etc.).

Figure 2A:
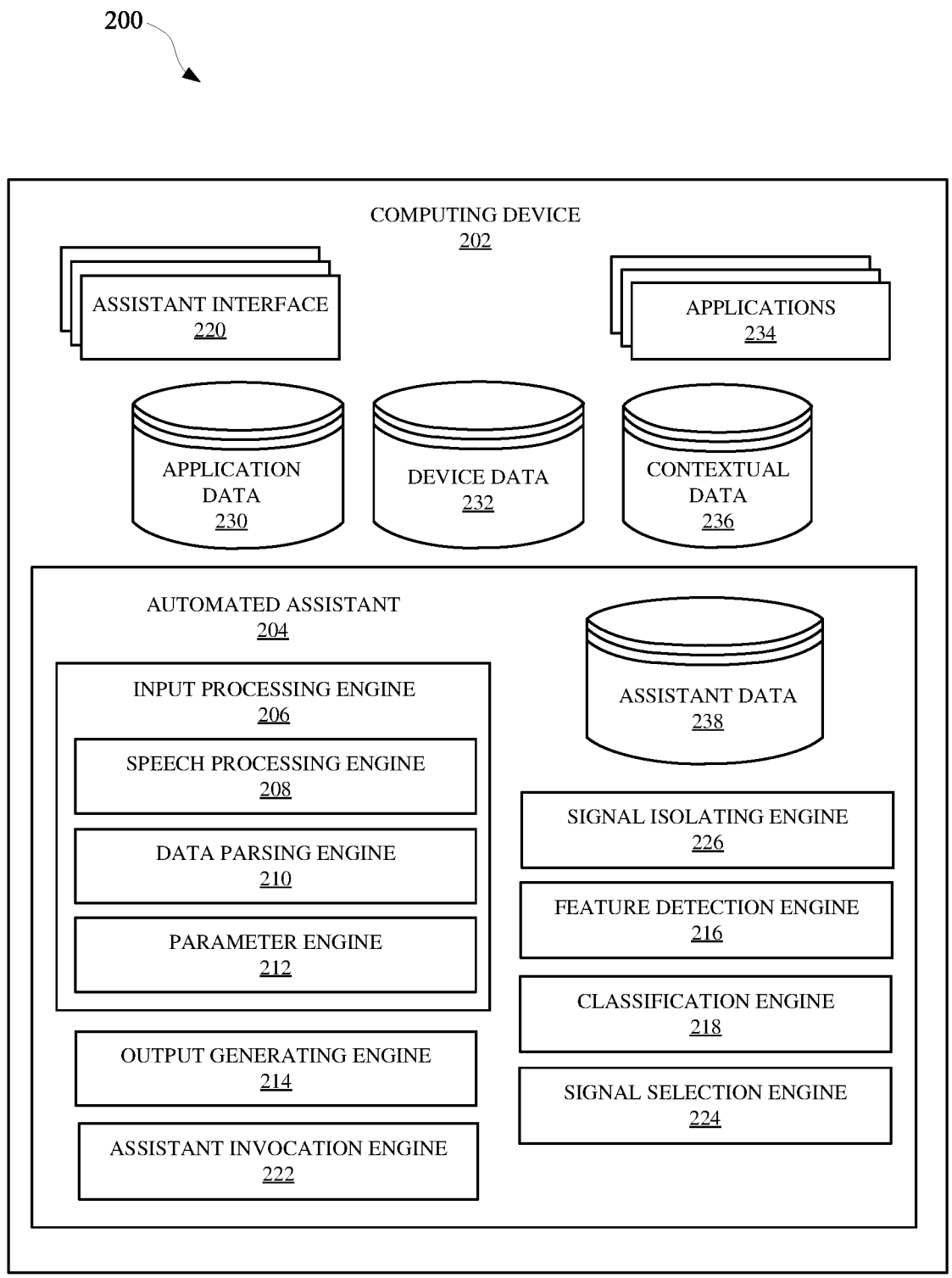
FIG. 2A and FIG. 2B illustrate a system for providing an automated assistant that can be invoked or otherwise controlled using touch gestures that manipulate wave propagation between one or more speakers and one or more microphones of the system.
Figure 2B:
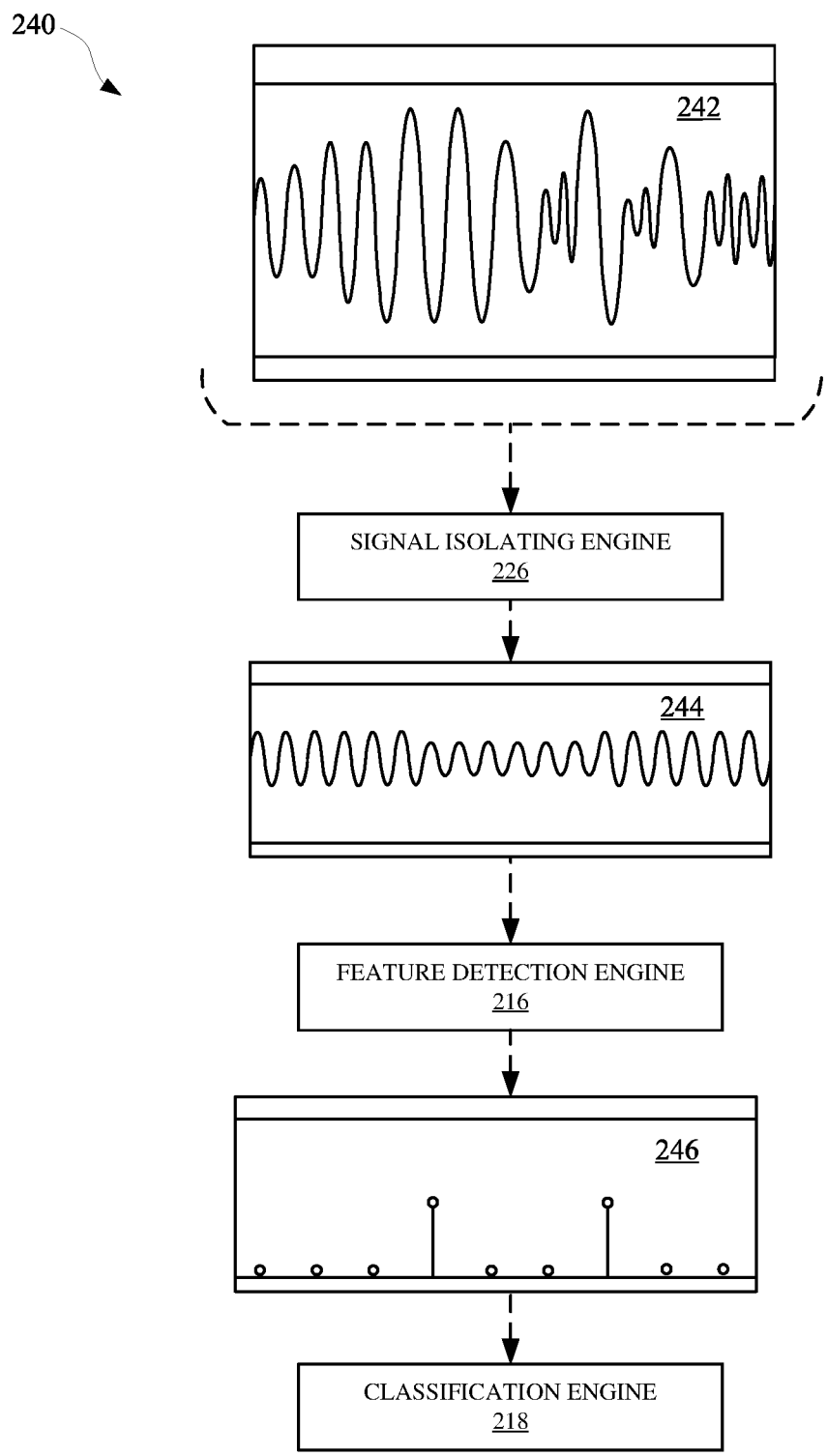

FIG. 2A and FIG. 2B illustrate a system 200 for providing an automated assistant 204 that can be invoked or otherwise controlled using touch gestures that manipulate wave propagation between one or more speakers and one or more microphones of a system 200. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IOT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment. Additionally, or alternatively, the assistant invocation engine 222 can cause the automated assistant 204 to detect, or limit detecting for one or more assistant commands from a user based on features of a context and/or an environment. In some implementations, the assistant invocation engine 222 can be disabled or limited based on the computing device 202 detecting an assistant suppressing output from another computing device. In this way, when the computing device 202 is detecting an assistant suppressing output, the automated assistant 204 will not be invoked based on contextual data 236—which would otherwise cause the automated assistant 204 to be invoked if the assistant suppressing output was not being detected.

In some implementations, the system 200 can include a signal isolating engine 226 that can process audio data generated from acoustic signals being generated by an output interface of the computing device 202 and being received at one or more microphones of the computing device 202. In some implementations, the acoustic signal that is received can be selected by a signal selection engine 224, which can identify parameters for an acoustic signal to be rendered via an output interface (e.g., an audio speaker) of the computing device 202. For example, parameters for the acoustic signal can be selected based on diagnostics or other process for determining how and when to transmit the acoustic signal. In some implementations, the signal selection engine 224 can limit providing the acoustic signal according to whether the computing device 202 is being worn by a user, based on one or more sensors of the computing device 202. In some implementations, the signal selection engine 224 can cause different acoustic signals to be provided at different frequencies and/or amplitudes to identify suitable signal parameters. For example, when a user is determined to be wearing the computing device 202, the signal selection engine 224 can cause an acoustic signal with a first frequency to be rendered and then detected at a microphone of the computing device 202. The signal selection engine 224 can determine, based on audio data detected at the microphone, whether the first frequency is suitable for the acoustic signal that will be used to detect touch gestures. If not, the signal selection engine 224 can cause a different acoustic signal with a second frequency to be rendered and then detected at the microphone of the computing device 202. The signal selection engine 224 can then determine, based on additional audio data detected at the microphone, whether the second frequency is suitable for the acoustic signal that will be used to detect touch gestures. This process can continue other frequencies, waveforms, pulse rates, latency settings, and/or any other parameters that can be used to modify a signal. Alternatively, or additionally, combinations of frequencies or other parameters can be tested concurrently to determine suitable parameters for generating the acoustic signal. The suitable parameters for the acoustic signal can then be selected based on an ability of the microphone to detect a particular acoustic signal under current circumstances (e.g., type of device, location of the user, background noise, detected motion, etc.), which can change from time to time. Therefore, this diagnostics process can be performed regularly and/or optionally by the signal selection engine 224 to improve the detectability of touch gestures.

In some implementations, the parameters of the acoustic signal can be selected based on contextual data 236 and/or any other data that can be available to the system 200. For example, when background noise is detected by the computing device 202, the signal selection engine 224 can identify and change parameters based on characteristics of the background noise (e.g., whether a pet is present, whether other ultrasonic devices are present, etc.). In some implementations, an amplitude of the acoustic signal can be selected based on an amplitude of the background noise (e.g., to compensate for the background noise). Alternatively, or additionally, one or more frequencies of the acoustic signal can be selected based on a dominant or non-dominant frequency detected in the background noise.

Alternatively, or additionally, parameters of the acoustic signal can be selected based on features of the computing device 202, such as an amount of available battery, a type of device (e.g., whether the computing device 202 is a smart watch, cellular phone, laptop, tablet, etc.), whether a sensor detects that the computing device 202 or user is in motion (e.g., the user is jogging with their smart watch) or detects the computing device 202 is static (e.g., the user is looking at their smart watch). Based on these parameters, the signal selection engine 224 can cause the computing device 202 or another computing device to render an acoustic signal to be detected by one or more input interfaces of the computing device 202. For example, a latency of the acoustic signal and/or a waveform of the acoustic signal can be adjusted according to the amount of power that is available from a battery of the computing device 202 and/or whether the user or computing device 202 is determined to be in motion or static.

When the acoustic signal is being rendered by the computing device 202, one or more microphones of the computing device 202 can capture resulting audio (e.g., acoustic vibrations traveling through the housing of the computing device 202) embodying the acoustic signal, which can then be used to generate audio data. The audio data can be processed by the signal isolating engine 226, which can filter or otherwise remove unwanted portions of the audio data to isolate a portion of the audio data corresponding to the acoustic signal. In some implementations, a bandpass, low pass, high pass, digital, and/or analog filter(s) can be utilized to at least partially isolate any representation of the acoustic signal from the audio data. For example, the signal isolating engine 226 can operate to filter out frequencies below 19.9 kHz and above 20.1 kHz, thereby allowing frequencies between 19.9 kHz and 20.1 kHz to be available for further processing in any resulting data. When the audio data has been processed via the signal isolating engine 226, a feature detection engine 216 can be utilized to process the resulting data in furtherance of determining certain features of resulting data.

For example, and as illustrated in FIG. 2B, audio data 242 can be received by the signal isolating engine 226, which can process the audio data to generate resulting data 244 that represents any changes to a particular acoustic signal provided by a speaker of the computing device 202. As illustrated in FIG. 2B, the resulting data can represent the acoustic signal (e.g., a 20 kHz signal) after having been transmitted from the speaker to one or more microphones, thereby causing some changes to the acoustic signal from an environment of the computing device 202. In some instances, if the user has performed a touch gesture at or near the microphone, the resulting data 244 can exhibit changes that can be caused by the touch gesture. For example, the resulting data 244 can include a brief dip in amplitude as a result of the user tapping an aperture of a housing of the computing device 202 at or near the microphone. This resulting data 244 can be provided to a feature detection engine 216, which can process the resulting data 244 for detecting whether the resulting data 244 exhibits certain features, and generate feature data 246 based on the detected features.

In some implementations, the feature detection engine 216 can process the resulting data to detect changes such as instant or gradual changes in amplitude, and/or instant or gradual changes in frequency. For example, the changes in amplitude exhibited by the resulting data 244 can be characterized by "positive" values in the feature data 246. Alternatively, or additionally, a feature can be multiple changes occurring within a duration of time, and the feature can be indicated by a single value in the feature data, as opposed to a series of multiple values. Alternatively, or additionally, a feature can be detected in data derived from a first microphone and an additional feature can be detected in data derived form a second microphone. A relationship between the feature and the additional feature can be indicative of a particular gesture performed by a user, and can be classified by a classification engine 218 of the system 200. For example, the two "positive" values exhibited by the feature data 246 can be processed by the classification engine 218, which can determine that instances of positive values appearing in the feature data 246 in this way is indicative of a tap gesture. In some implementations, the classification engine 218 can operate according to one or more heuristic processes and/or one or more trained machine learning models. In some implementations, training of the classification engine 218 can be performed using training data that is generated under a variety of different circumstances, conditions, and/or environments prior to any user acquiring the computing device 202. Alternatively, or additionally, training data can be generated over time, with prior permission from users, from data that indicates how certain users are using the touch gesture features. Models can then be trained at servers using this data, and thereafter the updated models can be provided to the modules of the classification engine 218. In this way, false positives can be mitigated over time for various devices that may employ these techniques of facilitating touch gestures.

The classification engine 218 can process feature data generated by the feature detection engine 216 to determine one or more operations to perform based on the identified gesture. In some implementations, the one or more operations can include a routine, which can involve one or more actions or other operations being performed by an application(s) 234 and/or the automated assistant 204. In some implementations, the classification engine 218 can, based on the feature data 246, generate one or more probabilities that indicate whether certain respective gestures have been performed. For example, feature data can be processed constantly, or at different intervals, by multiple different modules of the classification engine 218, and each module can be responsible for providing a probability for a particular gesture. When a particular module outputs a probability value that satisfies a threshold probability, a particular gesture corresponding to the particular module can be identified. Thereafter, one or more operations associated with the particular gesture and/or a context of the gesture (e.g., whether a particular application is executing at the computing device 202) can be initialized. For example, a particular module corresponding to a tap gesture can provide a probability value of N=0.8 based on the feature data 246, and this probability value can satisfy a fixed or adjustable threshold (e.g., N>=0.75) for indicating that a tap gesture has been received. In some implementations, a module can process instances of feature data generated from multiple different microphones to determine whether certain gestures such as swipe gestures have been detected at or near the different microphones. For example, instances of feature data can be processed separately or in combination (e.g., combined as matrices) by a module for detecting swipe gestures, and can output a probability M at various intervals to indicate whether a swipe gesture was received.

Figure 3:
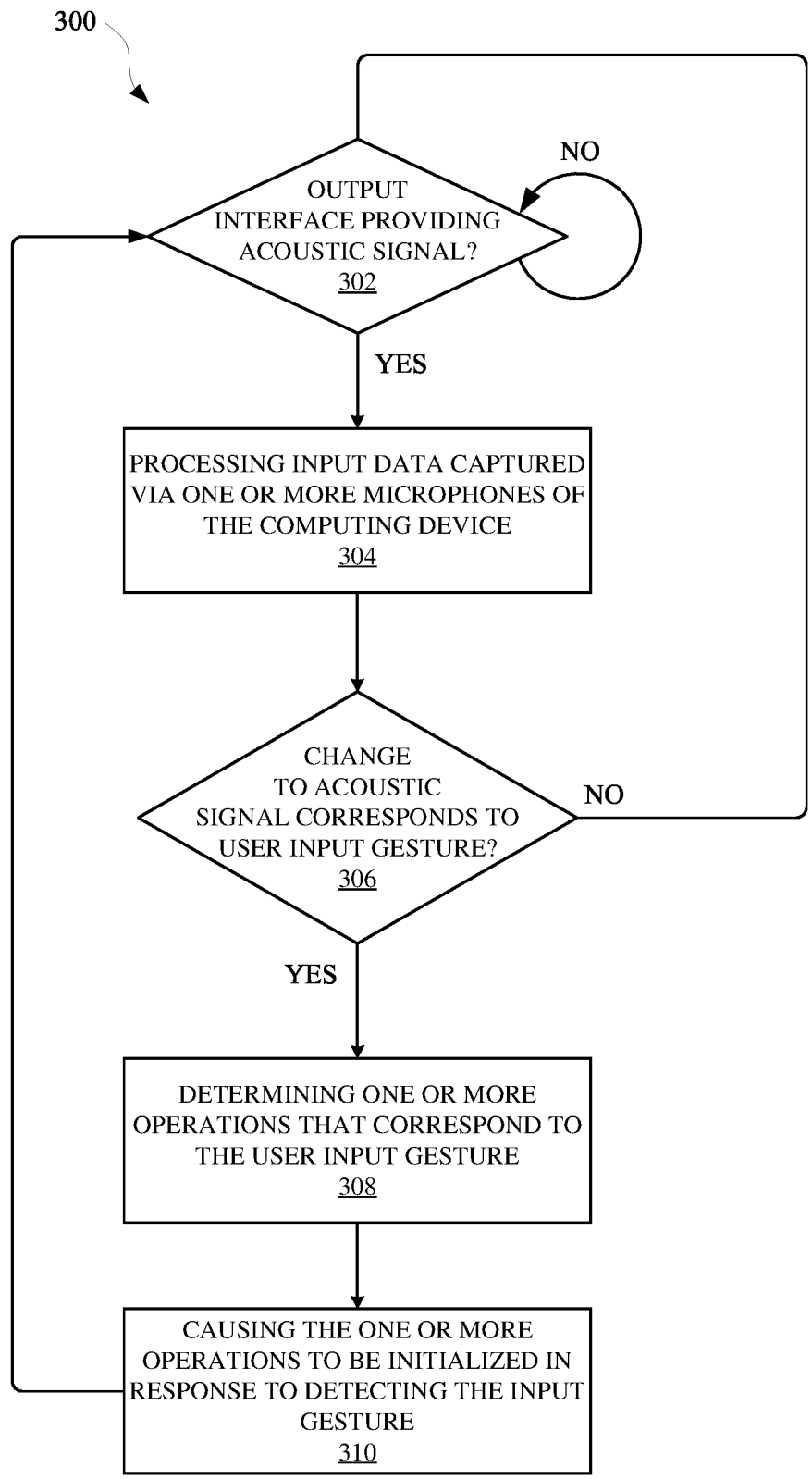
FIG. 3 illustrates a method for facilitating touch gestures at a computing device that includes at least one or more microphones and one or output interfaces, such as an audio speaker.

FIG. 3 illustrates a method 300 for facilitating touch gestures at a computing device that includes at least one or more microphones and one or output interfaces, such as an audio speaker. The method 300 can be performed by one or more computing devices, applications, and/or any other apparatus or module that can be associated with an automated assistant. The method 300 can include an operation 302 of determining whether an output interface of a computing device is providing an acoustic signal, or other signal, that is being captured by a microphone of the computing device. For example, an operating system or other application of the computing device can cause the output interface to render an ultrasonic signal that can be detected by one or more microphones of the computing device. The ultrasonic signal can be provided while the output interface of the computing device is rendering other audio output, such as music and/or an assistant output, and the ultrasonic signal can induce vibrations in a housing of the computing device. For example, when the computing device is a wearable computing device such as a watch, various portions of the housing of the watch can vibrate from the ultrasonic signal, and those vibrations can be detectable by one or more microphones (despite any apparent background noise), which can be accessible through one or more apertures of the housing.

When the output interface is determined to be providing the acoustic signal, the method 300 can proceed from the operation 302 to an operation 304. Otherwise, the method 300 can return to the operation 302 for determining whether the output interface is providing the acoustic signal. The operation 304 can include processing input data captured via one or more microphones of the computing device. In some implementations, the input data can be processed to determine the type of change that occurred in the input data and/or certain characteristics of the input data. The input data can characterize one or more acoustic signals received at one or more microphones of the computing device, and the one or more acoustic signals can be processed to generate a time-resolved amplitude representation of the one or more acoustic signals. For example, a fast Fourier transform, or other audio processing technique, can be utilized to isolate one or more signal frequencies corresponding to the ultrasonic signal. When the ultrasonic signal is isolated in the input data, the time-resolved amplitude representation of the ultrasonic signal can be further processed for determining whether any changes to the input data can be determined from the time-resolved amplitude representation. For example, the particular change can include a discrete change in amplitude that occurred within a threshold duration of time, thereby indicating that a tap gesture may have occurred. Alternatively, or additionally, the particular change can include a gradual change in amplitude at a first microphone, followed by a gradual change in amplitude at a second microphone, thereby indicating that a slide gesture (e.g., an extremity being slid across the housing) may have occurred.

When the change to the acoustic signal is determined to be apparent in the input data, the method 300 can proceed from the operation 304 to an operation 306. Otherwise, the method 300 can return to the operation 302 for determining whether the output interface is still providing the acoustic signal. The operation 306 can include determining whether the change to the acoustic signal corresponds to a particular user input gesture. For example, one or more heuristic processes and/or one or more trained machine learning models can be utilized to determine whether a change to input being captured by one or more microphones corresponds to a particular user input gesture. When the computing device includes a housing with an aperture for a single microphone, a user can tap the aperture to cause a brief change in amplitude of the ultrasonic signal, and this change in amplitude can be characterized by the input data. Therefore, when such a change in amplitude indicates that the user performed a tap gesture, certain operations assigned to the tap gesture can be initialized. Alternatively, or additionally, when the computing device includes multiple apertures, and each aperture is assigned a microphone, the computing device and/or any other application can be responsive to two-dimensional gestures.

For example, a swipe gesture can include the user covering a first microphone aperture with their finger, and then sliding their finger across the housing of the computing device to cover a second microphone aperture. This can cause a brief change in amplitude in a first instance of input data for the first microphone, and a subsequent brief change in amplitude in a second instance of input data for the second microphone. A direction of the swipe can be determined based on the instance of data that first exhibits the brief change in amplitude, and an arrangement of the apertures on the computing device relative to the user. For example, when the computing device is a wearable device such as a smart watch, and the smart watch is being worn on a left hand (or other extremity) of the user, the user may view the first aperture as being to the left of the second aperture. Therefore, a brief change in amplitude detected at the first aperture and then the second aperture would indicate that the user is swiping the smart watch from left to right (e.g., performing a right swipe gesture). When the computing device does not include a touch display interface or any capacitive touch interface, such touch gestures can be facilitated thereby improving the versatility of the computing device without necessitating hardware additions. This can reduce waste that may occur from users disposing of their devices for other devices that include the additional hardware additions, and also reduce energy consumption when such hardware additions are less energy efficient than enabling the touch gestures discussed herein.

When the change to the acoustic signal is determined to correspond to a user input gesture, the method 300 can proceed from the operation 306 to an operation 308. Otherwise, the method 300 can return to the operation 302. The operation 308 can include determining one or more operations that correspond to the user input gesture. In some implementations, the one or more operations can be identified in operation data that correlates the certain operations to certain input gestures. Alternatively, or additionally, the operations can be selected according to the input gesture that is identified and/or other contextual data associated with the input gesture. In some implementations, the one or more operations can be selected according to one or more heuristic processes and/or one or more trained machine learning models. For example, data characterizing an input gesture can be processed with alone or in combination with other data (e.g., contextual data, application data, etc.) to determine one or more operations to perform in response to the input gesture. When the one or more operations are identified, the method 300 can proceed from the operation 308 to an operation 310.

The operation 310 can include causing the one or more operations to be initialized in response to detecting the input gesture. For example, a tap gesture performed when the computing device, such as a smart watch, is rendering a home screen at a display interface of the smart watch can result in the smart watch performing an operation of invoking the automated assistant. Thereafter, the user can provide a spoken input (e.g., "Create a calendar event for tomorrow . . . ") to the automated assistant without providing an initial invocation phrase (e.g., "Ok Assistant . . . "). Alternatively, or additionally, a swipe gesture (e.g., a swipe from a speaker aperture to a microphone aperture, or from a microphone aperture to another microphone aperture) can be performed when the automated assistant is rendering audible media at a smart speaker, and the swipe gesture can be received at a housing of the smart speaker. As a result, the swipe gesture can cause the automated assistant to skip the current media track being audibly rendered, and start rendering a different media track. Alternatively, the swipe gesture can cause the automated assistant to initialize a particular routine or operation according to the detected direction of the swipe gesture (e.g., a left swipe can cause the automated assistant to provide a weather report and a right swipe gesture can cause the automated assistant to provide an agenda for the day). In this way, certain smart speakers can be "retrofitted" to facilitate automated assistant interactions, despite not having a touch display interface and/or certain other assistant hardware interfaces.

Figure 4:
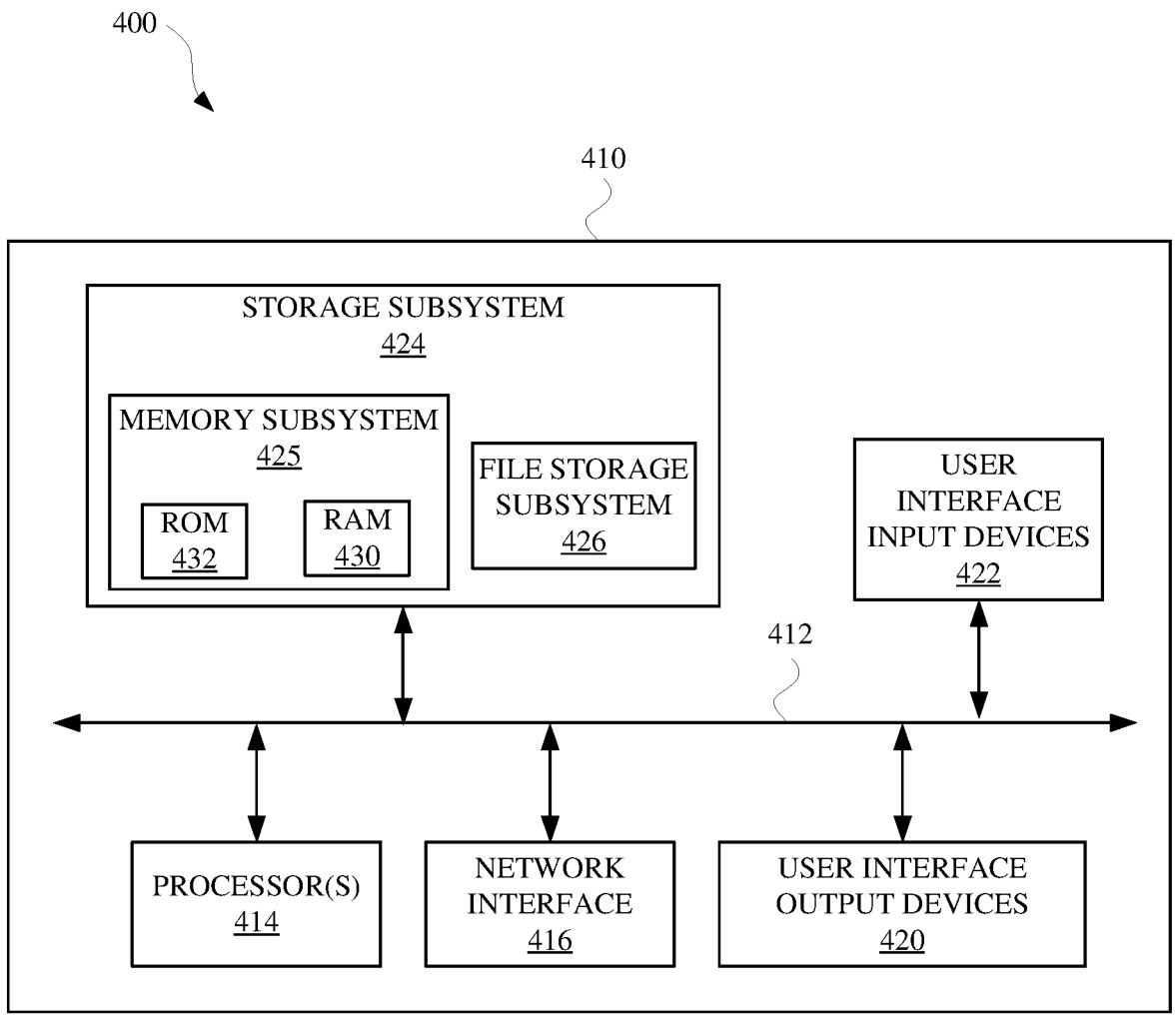
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 104, automated assistant, and/or any other application, device, apparatus, and/or module discussed herein. These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method is provided that includes causing an output interface of a computing device to render an acoustic signal that can be captured by a microphone of the computing device. The computing device includes an automated assistant application that provides access to an automated assistant that is responsive to natural language input from a user. The method further includes processing audio data, that is captured by the microphone of the computing device, and that characterizes at least a portion of the acoustic signal, that is rendered by the output interface as the acoustic signal is being captured by the microphone of the computing device. The audio data includes an instance of data characterizing a change to the acoustic signal caused by the user directly touching an area of a housing of the computing device. The method further includes determining, based on processing the audio data, that the instance of data characterizing the change to the acoustic signal corresponds to a touch gesture for invoking the automated assistant. The touch gesture is performed when the user directly touches the area of the housing that does not include a touch display interface. The method further includes causing, based on determining that the change to the acoustic signal corresponds to the touch gesture, the automated assistant application to initialize in furtherance of receiving a subsequent natural language input from the user via the microphone or another computing device.

These and other implementations of the technology disclosed herein can include one or more of the following features.

In some implementations, the housing of the computing device includes an aperture for the microphone, and the touch gesture includes a covering, by the user, of the aperture with an extremity (e.g., a finger) of the user simultaneous to the acoustic signal being rendered via the output interface of the computing device.

In some implementations, the housing of the computing device includes an aperture for the microphone and an additional aperture for the output interface. In some versions of those implementations, the touch gesture includes direct contact, by the user, with the portion of the housing between the aperture and the additional aperture simultaneous to the acoustic signal being rendered via the output interface of the computing device. In some of those versions, determining that the instance of data corresponds to the touch gesture for invoking the automated assistant includes: determining, based on processing the audio data, that the user slid an extremity toward or away from the aperture for the microphone while directly contacting the housing; and determining, based on determining that the user slid the extremity toward or away from the aperture, that the instance of data corresponds to the touch gesture for invoking the automated assistant.

In some implementations, the acoustic signal rendered by the computing device is an ultrasonic signal and the output interface includes an audio speaker.

In some implementations, determining, based on processing the audio data, that the instance of data characterizing the change to the acoustic signal corresponds to the touch gesture for invoking the automated assistant, includes classifying each of multiple portions, of the instance audio data, as either including the change to the acoustic signal or not including the change to the acoustic signal. In some of those implementations, determining that the instance of audio data corresponds to the touch gesture is based on the classifying indicating a threshold quantity of occurrences of the change to the acoustic signal within a duration of time. For example, the threshold quantity can be two, or greater than two and the duration of time can be between fifty milliseconds and seven hundred and fifty milliseconds, or other duration of time.

In some implementations, the method further includes processing contextual data, that characterizes one or more features of a context of the user associated with the computing device, and determining, based on the contextual data, one or more parameters for the acoustic signal to be provided by the microphone of the computing device. In some versions of those implementations, the one or more features of the context include a frequency of background noise captured by the microphone, and the one or more parameters include a separate frequency that is embodied in the acoustic signal and that is different from the frequency of the background noise. In some additional or alternative versions of those implementations, the one or more features of the context include an amplitude of background noise captured by the microphone, and the one or more parameters include a separate amplitude for the acoustic signal. In some additional or alternative versions of those implementations, the one or more features of the context include an amount of movement detected by a sensor of the computing device or another computing device, and the one or more parameters include an amount of latency between waveforms of the acoustic signal. In some additional or alternative versions of those implementations, the one or more features of the context include a type of device corresponding to the computing device.

In some implementations, a method is provided that includes causing an output interface of a computing device to render a signal that can be captured by a first microphone and a second microphone of the computing device. The computing device includes an automated assistant application that provides access to an automated assistant that can be responsive to natural language input from a user. The method further includes processing a first instance of audio data that characterizes input received by the first microphone and a second instance of audio data that characterizes separate input received by the second microphone. The input and the separate input are received simultaneous to the output interface rendering the signal. The method further includes determining, based on processing the first instance of audio data and the second instance of audio data, whether the user provided a touch input gesture that caused the input to exhibit a particular signal characteristic before or after the separate input exhibited the particular signal characteristic. The method further includes causing, in response to the user providing the touch input gesture, the automated assistant to initialize performance of one or more operations according to whether the input exhibited the particular signal characteristic, before or after the separate input, exhibited the particular signal characteristic.

These and other implementations of the technology disclosed herein can include one or more of the following features.

In some implementations, the first instance of audio data and the second instance of audio data characterize respective portions of the signal from the output interface, and the particular signal characteristic includes a temporary decline in amplitude of the respective portions of the signal. In some versions of those implementations, the one or more operations include: causing a volume setting to increase when it is determined that the input exhibits the particular signal characteristic before the separate input exhibits the particular signal characteristics; and causing the volume setting to decrease when it is determined that the input exhibits the particular signal characteristic after the separate input exhibits the particular signal characteristics.

In some implementations, the one or more operations include: causing the automated assistant to perform a first operation when it is determined that the input exhibits the particular signal characteristic before the separate input exhibits the particular signal characteristics; and causing the automated assistant to perform a second operation, that is different than the first operation, when it is determined that the input exhibits the particular signal characteristic after the separate input exhibits the particular signal characteristics. In some versions of those implementations, the first operation includes a preconfigured routine involving actions being performed by the automated assistant, and the second operation includes another preconfigured routine involving other actions being performed by the automated assistant.

In some implementations, a method is provided that includes causing an audio output interface of a computing device to render an acoustic signal that embodies one or more ultrasonic frequencies. The computing device is in communication, via a wireless communication protocol, with a separate computing device that provides access to one or more applications. The method further includes processing audio data generated by an audio input interface that is attached to a housing of the computing device. The audio data is generated during rendering of the acoustic signal by the audio output interface of the computing device. The method further includes determining, based on processing the audio data, that a user provided a touch gesture to the housing of the computing device. The touch gesture to the housing modifies an acoustic signal received by the audio input interface when audio output interface is rendering the acoustic signal. The method further includes causing, based on the touch gesture to the housing of the computing device, the computing device to control the one or more applications of the separate computing device in response to the user providing the touch gesture.

These and other implementations of the technology disclosed herein can include one or more of the following features.

In some implementations, the housing of the computing device includes an aperture for the audio input interface and an additional aperture for the audio output interface. In some versions of those implementations, the touch gesture includes direct contact, by the user, with the portion of the housing between the aperture and the additional aperture simultaneous to the acoustic signal being rendered via the audio output interface of the computing device. In some of those versions, the computing device includes a watch that is worn on a wrist of the user and that communicates with the separate computing device via Bluetooth.

In some implementations, wherein the housing of the computing device includes an aperture for the audio input interface, and the touch gesture includes a covering, by the user, of the aperture with an extremity of the user simultaneous to the acoustic signal being rendered via the audio output interface of the computing device.

I claim:
1. A method implemented by one or more processors, the method comprising:
processing contextual data that includes a type of device corresponding to a computing device;
determining, based on processing the contextual data, including the type of device, one or more rendering parameters for an acoustic signal that can be captured by a microphone of the computing device;
causing an output interface of a computing device to render the acoustic signal with the one or more rendering parameters determined based on processing the contextual data,
wherein the computing device includes an automated assistant application that provides access to an automated assistant that is responsive to natural language input from a user;
processing audio data, that is captured by the microphone of the computing device, and that characterizes at least a portion of the acoustic signal, that is rendered by the output interface as the acoustic signal is being captured by the microphone of the computing device,
wherein the audio data includes an instance of data characterizing a change to the acoustic signal caused by the user directly touching an area of a housing of the computing device;
determining, based on processing the audio data, that the instance of data characterizing the change to the acoustic signal corresponds to a touch gesture for invoking the automated assistant,
wherein the touch gesture is performed when the user directly touches the area of the housing that does not include a touch display interface; and
causing, based on determining that the change to the acoustic signal corresponds to the touch gesture, the automated assistant application to initialize in furtherance of receiving a subsequent natural language input from the user via the microphone or another computing device.

2. The method of claim 1,
wherein the housing of the computing device includes an aperture for the microphone, and
wherein the touch gesture includes a covering, by the user, of the aperture with an extremity of the user simultaneous to the acoustic signal being rendered via the output interface of the computing device.

3. The method of claim 1,
wherein the housing of the computing device includes an aperture for the microphone and an additional aperture for the output interface, and
wherein the touch gesture includes direct contact, by the user, with the portion of the housing between the aperture and the additional aperture simultaneous to the acoustic signal being rendered via the output interface of the computing device.

4. The method of claim 3, wherein determining that the instance of data corresponds to the touch gesture for invoking the automated assistant includes:
determining, based on processing the audio data, that the user slid an extremity toward or away from the aperture for the microphone while directly contacting the housing; and
determining, based on determining that the user slid the extremity toward or away from the aperture, that the instance of data corresponds to the touch gesture for invoking the automated assistant.

5. The method of claim 1, wherein the acoustic signal rendered by the computing device is an ultrasonic signal and the output interface includes an audio speaker.

6. The method of claim 1, wherein determining, based on processing the audio data, that the instance of data characterizing the change to the acoustic signal corresponds to the touch gesture for invoking the automated assistant, comprises:
classifying each of multiple portions, of the instance audio data, as either including the change to the acoustic signal or not including the change to the acoustic signal; and
determining that the instance of audio data corresponds to the touch gesture based on the classifying indicating a threshold quantity of occurrences of the change to the acoustic signal within a duration of time.

7. The method of claim 1, wherein the one or more features of the context include a frequency of background noise captured by the microphone, and the one or more rendering parameters include a separate frequency that is embodied in the acoustic signal and that is different from the frequency of the background noise.

8. The method of claim 1, wherein the one or more features of the context include an amplitude of background noise captured by the microphone, and the one or more rendering parameters include a separate amplitude for the acoustic signal.

9. The method of claim 1, wherein the one or more features of the context include an amount of movement detected by a sensor of the computing device or another computing device, and the one or more rendering parameters include an amount of latency between waveforms of the acoustic signal.

10. A method implemented by one or more processors, the method comprising:
processing contextual data to detect whether a computing device is in motion or is static;
determining, based on whether the computing device is in motion or is static, one or more rendering parameters for an acoustic signal that can be captured by a first microphone and a second microphone of the computing device;
causing an output interface of a computing device to render the acoustic signal with the one or more rendering parameters determined based on processing the contextual data;
wherein the computing device includes an automated assistant application that provides access to an automated assistant that can be responsive to natural language input from a user;
processing a first instance of audio data that characterizes input received by the first microphone and a second instance of audio data that characterizes separate input received by the second microphone,
wherein the input and the separate input are received simultaneous to the output interface rendering the signal;
determining, based on processing the first instance of audio data and the second instance of audio data, whether the user provided a touch input gesture that caused the input to exhibit a particular signal characteristic before or after the separate input exhibited the particular signal characteristic; and
causing, in response to the user providing the touch input gesture, the automated assistant to initialize performance of one or more operations according to whether the input exhibited the particular signal characteristic before or after the separate input exhibited the particular signal characteristic.

11. The method of claim 10, wherein the first instance of audio data and the second instance of audio data characterize respective portions of the signal from the output interface, and the particular signal characteristic includes a temporary decline in amplitude of the respective portions of the signal.

12. The method of claim 11,
wherein the one or more operations include causing a volume setting to increase when it is determined that the input exhibits the particular signal characteristic before the separate input exhibits the particular signal characteristics, and
wherein the one or more operations include causing the volume setting to decrease when it is determined that the input exhibits the particular signal characteristic after the separate input exhibits the particular signal characteristics.

13. The method of claim 10,
wherein the one or more operations include causing the automated assistant to perform a first operation when it is determined that the input exhibits the particular signal characteristic before the separate input exhibits the particular signal characteristics, and
wherein the one or more operations include causing the automated assistant to perform a second operation, that is different than the first operation, when it is determined that the input exhibits the particular signal characteristic after the separate input exhibits the particular signal characteristics.

14. The method of claim 13, wherein the first operation includes a preconfigured routine involving actions being performed by the automated assistant, and the second operation includes another preconfigured routine involving other actions being performed by the automated assistant.

15. A method implemented by one or more processors, the method comprising:
processing contextual data to detect whether a computing device is in motion or is static;
determining, based on whether the computing device is in motion or is static, one or more ultrasonic frequencies for an acoustic signal to be rendered by an audio output interface of the computing device;
causing the audio output interface of the computing device to render the acoustic signal that embodies one or more ultrasonic frequencies determined based on processing the contextual data,
  wherein the computing device is in communication, via a wireless communication protocol, with a separate computing device that provides access to one or more applications;
processing audio data generated by an audio input interface that is attached to a housing of the computing device,
  wherein the audio data is generated during rendering of the acoustic signal by the audio output interface of the computing device;
determining, based on processing the audio data, that a user provided a touch gesture to the housing of the computing device,
  wherein the touch gesture to the housing modifies an acoustic signal received by the audio input interface when audio output interface is rendering the acoustic signal; and
causing, based on the touch gesture to the housing of the computing device, the computing device to control the one or more applications of the separate computing device in response to the user providing the touch gesture.

16. The method of claim 15,
wherein the housing of the computing device includes an aperture for the audio input interface and an additional aperture for the audio output interface, and
wherein the touch gesture includes direct contact, by the user, with the portion of the housing between the aperture and the additional aperture simultaneous to the acoustic signal being rendered via the audio output interface of the computing device.

17. The method of claim 16, wherein the computing device includes a watch that is worn on a wrist of the user and communicates with the separate computing device via Bluetooth.

18. The method of claim 15,
wherein the housing of the computing device includes an aperture for the audio input interface, and
wherein the touch gesture includes a covering, by the user, of the aperture with an extremity of the user simultaneous to the acoustic signal being rendered via the audio output interface of the computing device.

19. The method of claim 15, further comprising:
subsequent to causing, based on the touch gesture to the housing of the computing device, the computing device to control the one or more applications of the separate computing device in response to the user providing the touch gesture:
  processing updated contextual data that characterizes one or more updated features of an updated context of the user;
  determining, based on processing the updated contextual data, one or more updated ultrasonic frequencies for an updated acoustic signal to be provided by the audio output interface;
  causing the audio output interface of the computing device to render the updated acoustic signal that embodies the one or more updated ultrasonic frequencies determined based on processing the updated contextual data,
  processing further audio data generated by the audio input interface,
    wherein the further audio data is generated during rendering of the updated acoustic signal by the radio output interface;
  determining, based on processing the updated audio data, whether the user provided a further touch gesture to the housing of the computing device.

20. The method of claim 1, wherein the type of device is one of a smart watch, a cellular phone, a laptop, or a tablet.

* * * * *